United States Patent [19]

Takeuchi et al.

[11] Patent Number: 4,672,839

[45] Date of Patent: Jun. 16, 1987

[54] VIBRATION SENSOR

[75] Inventors: Tadashi Takeuchi; Kunihiro Ushida, both of Aichi, Japan

[73] Assignee: NGK Spark Plug Co., Ltd., Aichi, Japan

[21] Appl. No.: 800,258

[22] Filed: Nov. 21, 1985

[30] Foreign Application Priority Data

Nov. 27, 1984 [JP] Japan .................. 59-179853[U]

[51] Int. Cl.⁴ ...................... G01L 23/22; G01H 11/08
[52] U.S. Cl. ....................................... 73/35; 310/319; 310/329
[58] Field of Search ............. 73/35, 651, 654, DIG. 4; 310/317, 319, 329

[56] References Cited

U.S. PATENT DOCUMENTS

| | | | |
|---|---|---|---|
| 3,349,629 | 10/1967 | Elazar | 310/329 |
| 4,451,753 | 5/1984 | Ogawa et al. | 310/317 |
| 4,549,089 | 10/1985 | Buetemeister et al. | 73/35 |

Primary Examiner—Stewart J. Levy
Assistant Examiner—John E. Chapman, Jr.
Attorney, Agent, or Firm—Sughrue, Mion, Zinn, Macpeak & Seas

[57] ABSTRACT

An improved vibration sensor of a type used to monitor the vibration and knocking level of an automotive engine or the like. The vibration sensor includes a casing having a cavity in which is received a resonant plate composed of a metal plate and a piezoelectric element. The piezoelectric element has electrodes disposed on opposite sides thereof, one abutting the metal plate. The electrode abutting the metal plate has an extended portion which passes around the edge of the piezoelectric body of the piezoelectric element, extending onto the opposite surface with a gap formed between the end of the extended electrode portion and the electrode on this opposite surface. A thin resistor, such as may be formed by a layer of a resistive paste or a chip resistor, is installed across the gap between the end of the extended electrode layer and the opposing electrode.

6 Claims, 7 Drawing Figures

VIBRATION SENSOR

BACKGROUND OF THE INVENTION

The present invention relates to a vibration sensor of a type using a piezoelectric element and which is used, for example, to sense the knocking or vibration of an internal combustion engine.

In this type of vibration sensor, it is necessary to provide a resistor in parallel with the piezoelectric element in order to reduce the amount of thermally generated noise when the piezoelectric element is rapidly heated and cooled and to cope with disconnection failures involving the leads of the element. Such an arrangement is shown schematically in FIG. 1.

In the conventional vibration sensor of this type, the resistor has been provided outside the casing of the piezoelectric element. This has the drawback of additional wiring steps and the possibility of failure due to the breakage of the resistor or the cutting of its circuit leads.

SUMMARY OF THE INVENTION

Accordingly, an object of the present invention is to eliminate the above-mentioned drawbacks of the conventional vibration sensor.

In accordance with the present invention, a resistor is provided inside the casing of the piezoelectric element connected in parallel therewith. The resistor is mounted on one surface of the piezoelectric element and is preferably made thin so as to not take up a significant amount of space inside the casing.

More specifically, the present invention provides a vibration sensor having a casing inside of which a resonant plate is received, with the piezoelectric element being mounted to the casing via a metal plate. A first electrode on one side of the piezoelectric element abuts the metal plate. This first electrode has an extended portion which is wrapped around an edge of the piezoelectric element, extending to the opposite surface thereof. A second electrode is disposed upon this opposite surface with a nonconductive gap being formed between a portion of the second electrode and the extended portion of the first electrode. In accordance with one embodiment of the invention, a resistor formed by a resistive paste bridges the gap, connecting the extended portion of the first electrode to the second electrode therethrough. In accordance with another embodiment of the invention, the resistor is formed by a thin chip.

DESCRIPTION OF THE PREFERRED EMBODIMENTS

Figure 1:
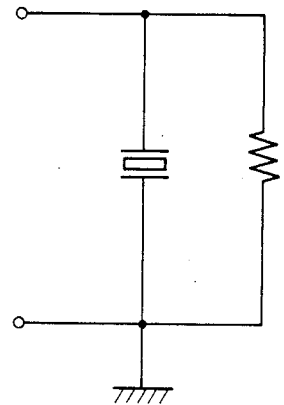
FIG. 1 is a schematic diagram of a conventional vibration sensor.
Figure 2:
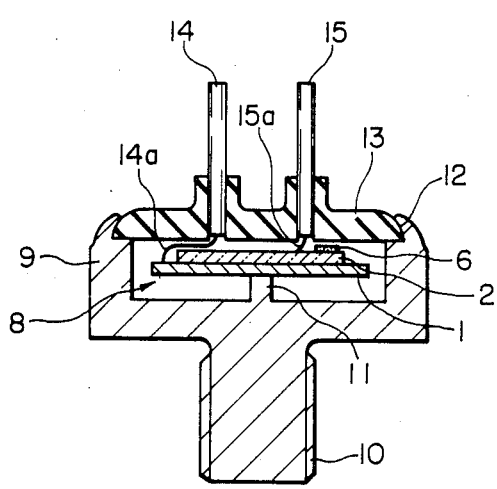
FIG. 2 is a cross-sectional view of a vibration sensor of the invention.

Referring now to FIG. 2, a vibration sensor of the invention will be described.

The vibration sensor includes a metal casing 9 having a cylindrical portion joined at one end to a threaded shank 10, the latter being screwed into the housing of the engine or other location where the sensor is to be employed. Above the threaded shank 10 is provided an integral post 11, upon which a metal plate 1 is fixed. A piezoelectric element 2 is mounted on the metal plate 1, the metal plate 1 and the piezoelectric element 2 together constituting a resonant plate 8. The inner chamber of the casing 9 in which the piezoelectric element 2 is received is closed by a cap 13, hermetically sealed to the upper rim of the casing 9 with a sealant 12. Terminals 14 and 15 pass through respective holes bored to the cap 13. The terminal 14 is connected via a lead wire 14a to the metal plate 1, while the terminal 15 is connected via a lead wire 15a to an electrode on the opposite surface of the piezoelectric element 2.

Figure 3:
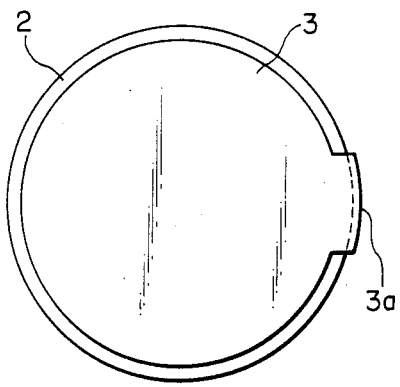
FIG. 3 is a bottom view of a piezoelectric element of the vibration sensor of FIG. 2.
Figure 4:
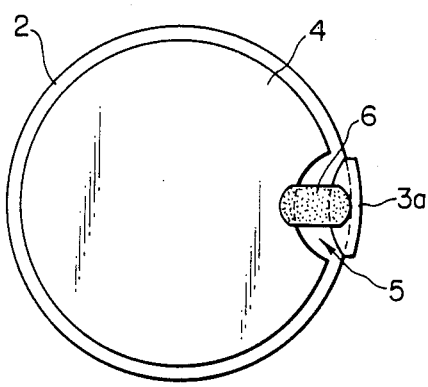
FIG. 4 is a top view of the piezoelectric element.
Figure 5:
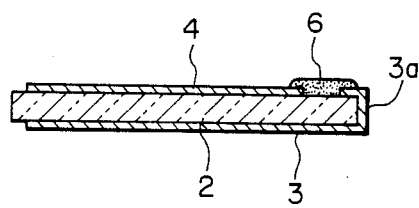
FIG. 5 is a cross-sectional view of the piezoelectric element.

The piezoelectric element 2 is shown in more detail in FIGS. 3 to 5 of the accompanying drawings. Electrodes 3 and 4 are deposited on opposite surfaces of a disk-shaped body of piezoelectric material. The electrode 3 is mounted in contact with the metal plate 1. The electrode 3 has an extended electrode portion 3a which is wrapped around the edge portion of the piezoelectric body and extends across a small portion of the opposite surface. The electrode 4 has a crescent-shaped cut-out portion opposing the edge of the end portion of the extended electrode portion 3a, thus forming therebetween a gap 5 containing no conducting material. Across the gap 5 is deposited a layer of resistive material 6, such as in the form of a resistive paste. The paste may be applied by printing or the like. The resistive layer 6 thus interconnects the electrodes 3 and 4, acting as a resistor connected in parallel with the piezoelectric element.

Figure 6:
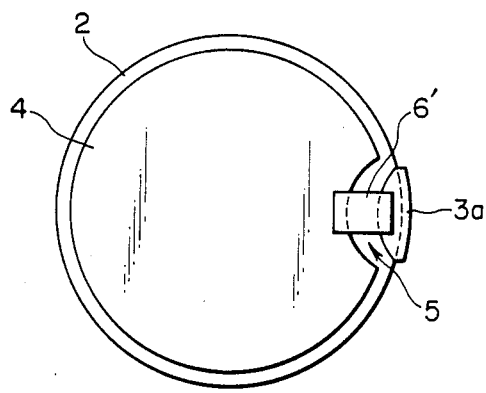
FIG. 6 is a top view of a piezoelectric element of another embodiment of the invention.
Figure 7:
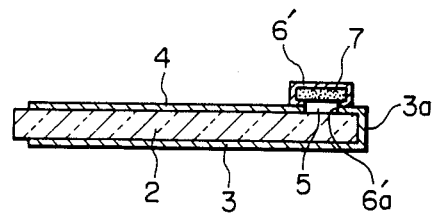
FIG. 7 is a cross-sectional view of the piezoelectric element of FIG. 6.

In another embodiment shown in FIGS. 6 and 7, the layer 6 is replaced by a chip resistor 6' formed, for example, by applying a resistive paste to the surface of a thin alumina plate 7 acting as a carrier plate. The alumina plate has a slit 6'a aligned with the gap 5 so as to prevent short circuiting between the ends of the resistor. Otherwise, the piezoelectric element of this embodiment is constructed the same as that first described.

Furthermore, although a disk-shaped piezoelectric body is employed in the above-described embodiments, the invention is not limited to such a shape. For instance, the piezoelectric element can be annularly shaped, rectangularly shaped, or the like. Moreover, the supporting post 11 is not limited to a single such post, and two posts can be provided to support the resonant plate 8 at two points. Also, the piezoelectric element 2 may be mounted in a cantilevered arrangement whereby it is connected to the inner surface of the cylindrical portion of the casing 9 at one end of the element 2.

With the inventive vibration sensor as described above, the resistor connected in parallel with the piezoelectric element is provided as an integral part of the sensor. That is, it is not necessary with the invention to provide an external resistor. Accordingly, the ease of installation and the reliability of the vibration sensor are much improved compared with the conventional device. Moreover, by using a thin element as the resistor, the overall size of the devices not increased.

This completes the description of the preferred embodiments of the invention. Although preferred embodiments have been described, it is believed that numerous modifications and alterations thereto would be apparent one having ordinary skill in the art without departing from the spirit and scope of the invention.

We claim:

1. A vibration sensor for sensing knocking of an internal combustion engine comprising: a metal casing having a threaded shank for direct mounting to said engine, said casing having a cavity within the face of said casing remote from said shank, a thin metal plate received in said cavity, a post projecting upwardly within said casing cavity such that said metal plate rests on said post to form a point contact between said post and said metal plate, and a piezoelectric element mounted on said metal plate, siad piezoelectric element comprising a piezoelectric body and first and second electrodes disposed on opposite surfaces thereof, said first electrode abutting said metal plate, said first electrode having an extended electrode portion extending around an edge of said piezoelectric body to the surface of the piezoelectric body on which said second electrode is disposed, a gap being present between siad extended electrode portion and an adjacent portion of said second electrode, and a resistor spanning across said gap between said extended electrode portion of said first electrode and said second electrode and being connected at opposite ends to said extended portion of said first electrode and said second electrode respectively, and a cap overlying said resistor and sealably closing off said cavity; whereby said resistor being inside the casing reduces the possibility of failure of the vibration sensor due to breakage of the resistor particularly as a result of rapid heating and cooling to which the vibration sensor is subjected.

2. The vibration sensor of claim 1, wherein said resistor comprises a layer of a resistive paste.

3. The vibration sensor of claim 1, wherein said resistor comprises a chip resistor.

4. The vibration sensor of claim 3, wherein said chip resistor comprises an insulating plate and a layer of a resistive paste formed on said plate.

5. The vibration sensor of claim 4, wherein said insulating plate of said resistor is made of alumina.

6. The vibration sensor of claim 1, wherein said piezoelectric element has a substantially disk shape.

* * * * *